US008062124B2

(12) United States Patent
Jaffe

(10) Patent No.: US 8,062,124 B2
(45) Date of Patent: Nov. 22, 2011

(54) GAMING MACHINE HAVING INCREMENTAL BONUS AWARDS

(75) Inventor: Joel R. Jaffe, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 859 days.

(21) Appl. No.: 11/883,082

(22) PCT Filed: Feb. 3, 2006

(86) PCT No.: PCT/US2006/003883
§ 371 (c)(1), (2), (4) Date: Jul. 26, 2007

(87) PCT Pub. No.: WO2006/086235
PCT Pub. Date: Aug. 17, 2006

(65) Prior Publication Data
US 2008/0311973 A1 Dec. 18, 2008

Related U.S. Application Data

(60) Provisional application No. 60/650,842, filed on Feb. 8, 2005.

(51) Int. Cl.
*G06F 17/00* (2006.01)
*G06F 19/00* (2011.01)
*A63F 9/24* (2006.01)
*A63F 13/00* (2006.01)

(52) U.S. Cl. .......................... 463/25; 463/16; 273/138.1

(58) Field of Classification Search .............. 463/16–20, 463/25, 29; 273/138.1, 139
See application file for complete search history.

(56) References Cited

U.S. PATENT DOCUMENTS

| | | | | |
|---|---|---|---|---|
| 6,004,207 | A * | 12/1999 | Wilson et al. | 463/20 |
| 6,471,208 | B2 * | 10/2002 | Yoseloff et al. | 273/143 R |
| 6,561,904 | B2 * | 5/2003 | Locke et al. | 463/25 |
| 6,569,013 | B1 * | 5/2003 | Taylor | 463/13 |
| 6,612,927 | B1 * | 9/2003 | Slomiany et al. | 463/16 |
| 6,638,164 | B2 * | 10/2003 | Randall et al. | 463/20 |
| 6,926,607 | B2 * | 8/2005 | Slomiany et al. | 463/20 |
| 7,094,148 | B2 * | 8/2006 | Baerlocher et al. | 463/20 |
| 7,121,942 | B2 * | 10/2006 | Baerlocher | 463/20 |
| 7,147,559 | B2 * | 12/2006 | Englman | 463/25 |
| 7,258,611 | B2 * | 8/2007 | Bigelow et al. | 463/25 |
| 7,455,585 | B2 * | 11/2008 | Englman | 463/16 |
| 7,530,894 | B1 * | 5/2009 | Marks et al. | 463/20 |
| 7,740,245 | B2 * | 6/2010 | Tarantino | 273/292 |
| 7,819,740 | B2 * | 10/2010 | Masci et al. | 463/20 |
| 2001/0048193 | A1 * | 12/2001 | Yoseloff et al. | 273/138.1 |

(Continued)

OTHER PUBLICATIONS

International Search Report, dated Sep. 6, 2006.

*Primary Examiner* — Milap Shah
(74) *Attorney, Agent, or Firm* — Nixon Peabody LLP

(57) ABSTRACT

A gaming machine for conducting a wagering game includes a display for displaying a plurality of symbols, the symbols indicating a randomly-selected outcome selected from a plurality of outcomes. The plurality of outcomes include at least one winning outcome wherein the winning outcome is associated with a bonus award. The gaming machine includes a controller operative to vary and display at least a portion of the plurality of symbols. If the symbols indicate the winning outcome, the controller is operative to award a payoff associated with the winning outcome and change the value of the bonus award for a future play of the gaming machine.

20 Claims, 7 Drawing Sheets

U.S. PATENT DOCUMENTS

| | | | | |
|---|---|---|---|---|
| 2002/0151354 | A1* | 10/2002 | Boesen et al. | 463/25 |
| 2003/0162585 | A1* | 8/2003 | Bigelow et al. | 463/20 |
| 2003/0216170 | A1* | 11/2003 | Walker et al. | 463/25 |
| 2003/0236115 | A1* | 12/2003 | Chamberlain | 463/16 |
| 2004/0053672 | A1* | 3/2004 | Baerlocher | 463/20 |
| 2004/0082373 | A1* | 4/2004 | Cole et al. | 463/13 |
| 2004/0087359 | A1 | 5/2004 | Cuddy et al. | 463/20 |
| 2004/0242316 | A1* | 12/2004 | Oles et al. | 463/20 |
| 2005/0037836 | A1* | 2/2005 | Gilmore et al. | 463/25 |
| 2006/0068884 | A1* | 3/2006 | Baerlocher et al. | 463/20 |
| 2006/0121978 | A1* | 6/2006 | Hornik et al. | 463/20 |
| 2006/0199634 | A1* | 9/2006 | Anderson et al. | 463/20 |
| 2008/0076513 | A1* | 3/2008 | Esses et al. | 463/20 |
| 2009/0108526 | A1* | 4/2009 | Moody | 273/274 |

* cited by examiner

GAMING MACHINE HAVING INCREMENTAL BONUS AWARDS

CROSS-REFERENCE TO RELATED APPLICATIONS

This application is a U.S. national phase of International Application No. PCT/US2006/003883, filed Feb. 3, 2006, which claims the benefit of priority of U.S. Provisional Patent Application No. 60/650,842, filed Feb. 8, 2005, both of which are incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having incremental bonus awards.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous/advantages in player appeal and excitement relative to other known games, and because such games are attractive to both players and operators, there is a continuing need to develop gaming machines with new types of bonus games to satisfy the demands of players and operators. The present invention is directed to a gaming machine having incremental bonus awards.

SUMMARY OF THE INVENTION

According to one aspect of the present invention, a gaming machine for conducting a wagering game includes a display for displaying a wagering game including a plurality of symbols indicating a randomly-selected outcome selected from a plurality of possible outcomes. At least one of the plurality of outcomes is a winning outcome which is associated with a bonus award. The gaming machine includes a controller operative to vary the displayed plurality of symbols. If the symbols indicate the winning outcome, the controller is operative to award a payoff associated with the winning outcome and change the value of the bonus award for a future play of the gaming machine.

According to another aspect of the invention, a method of conducting a wagering game on a gaming machine comprises receiving a wager, and displaying a plurality of moveable reels having symbols thereon, the symbols indicating a randomly-selected outcome selected from a plurality of possible outcomes, the plurality of outcomes including a plurality of winning outcomes. Each winning outcome is associated with a respective bonus award. The method further comprises spinning and stopping the reels, and for each winning outcome indicated, awarding a payoff comprising a credit amount associated with the winning outcome and the bonus award associated with the winning outcome, and incrementing the value of the bonus award associated with the winning outcome for a future spin.

According to yet another aspect of the invention, a method of conducting a wagering game on a gaming machine comprises receiving a wager, and displaying a plurality of moveable reels having symbols thereon, the symbols indicating a randomly-selected outcome selected from a plurality of possible outcomes, the plurality of outcomes including a plurality of winning outcomes. Each winning outcome is associated with a respective multiplier. The method further comprises awarding a group of free spins when a start bonus outcome is achieved and initializing a value of the multiplier associated with each winning outcome to an initial value. The method further comprises executing each free spin in the group, and for each winning outcome indicated, awarding a payoff and incrementing the multiplier associated with the winning outcome for a future free spin.

According to yet another aspect of the invention, a computer readable storage medium is encoded with instructions for directing a gaming device to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1:
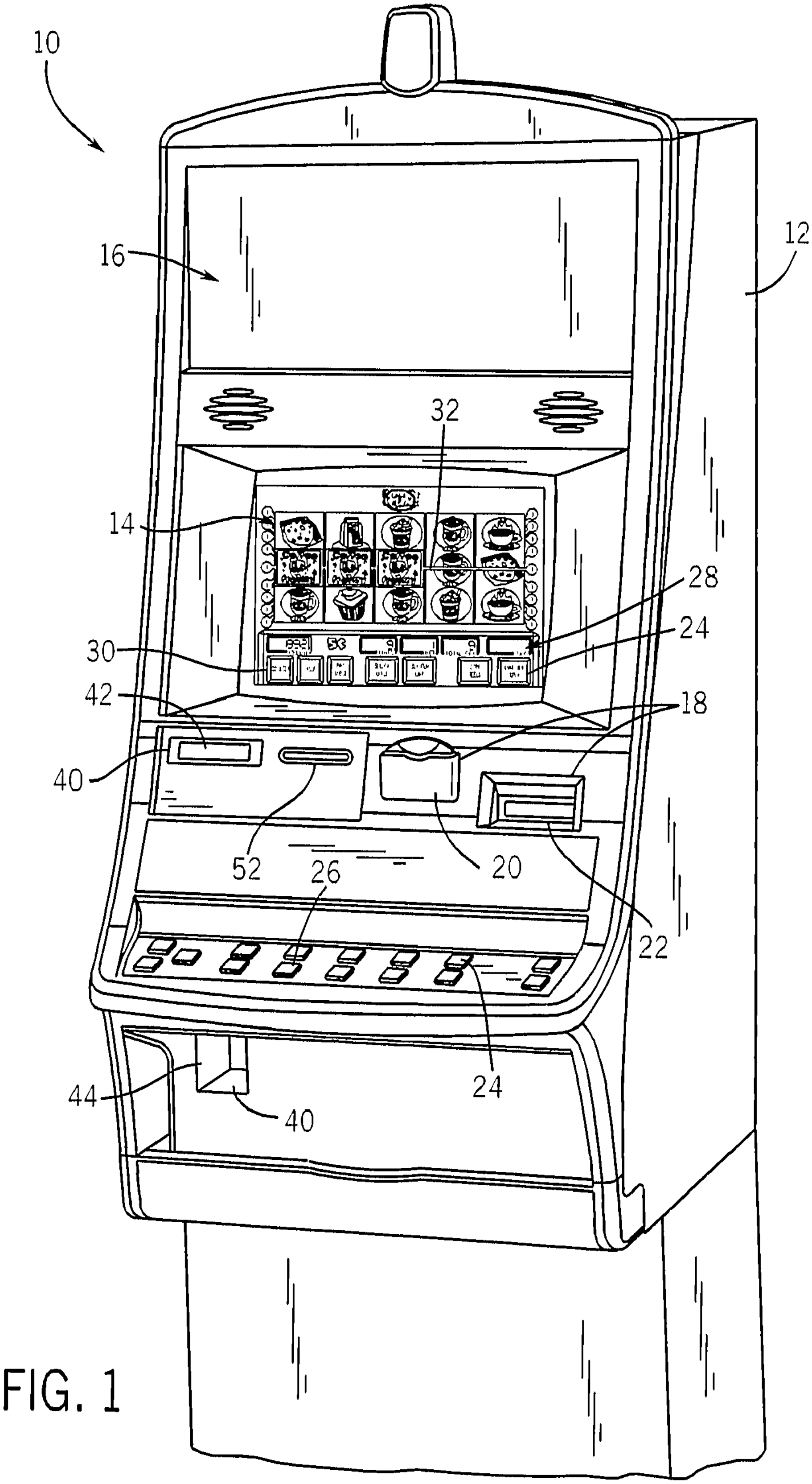
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits which are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an option on how to make their game selections. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual associated to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
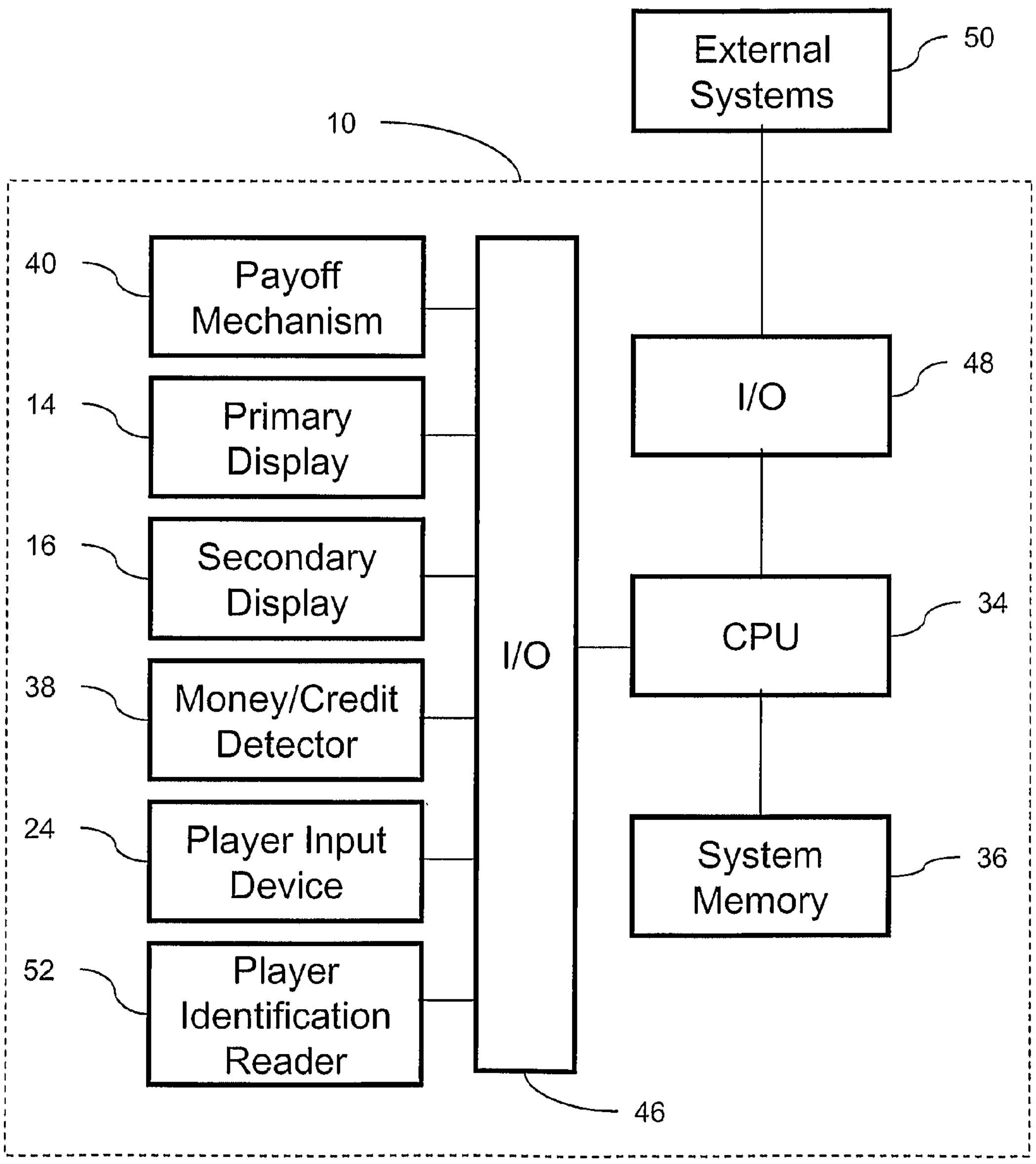
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
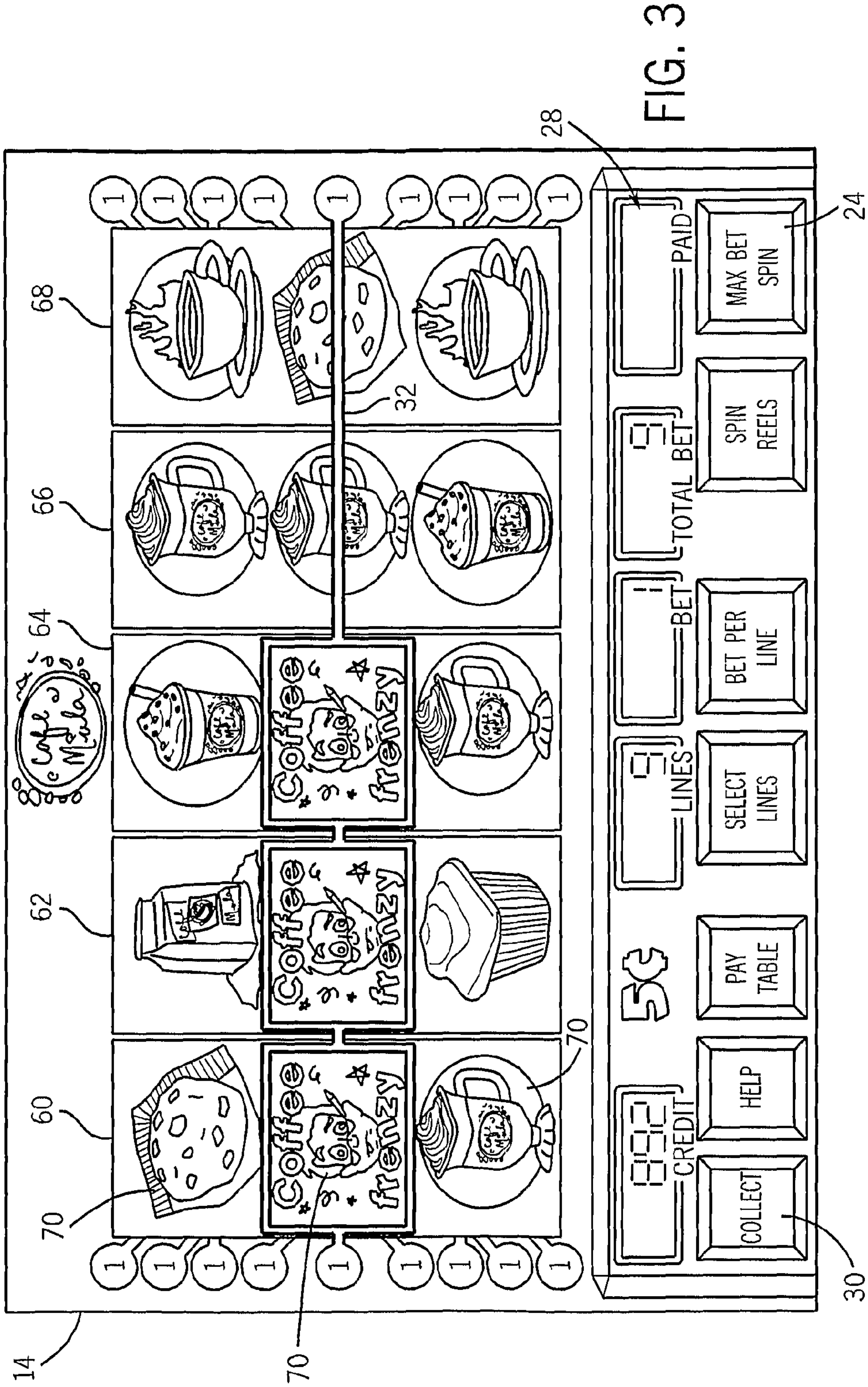
FIG. 3 is a front view of the primary display of a preferred embodiment of the gaming machine.

Turning now to FIG. 3, a first preferred embodiment of the gaming machine 10 is depicted wherein the primary display 14 displays a slot game entitled "Café Mula." The game comprises five reels 60,62,64,66,68 wherein each reel 60,62, 64,66,68 has a plurality of symbols 70 located thereon. The display 14 depicts one or more paylines 32 passing through the five reels 60,62,64,66,68 indicating combinations of symbols 70. Certain combinations of symbols 70 landing on one or more paylines 32 constitute a winning outcome for which a payoff is awarded by the gaming machine 10. Furthermore, at least one of the combinations of symbols 70 landing on one or more paylines 32 constitutes a start bonus outcome. In this embodiment, the three "Coffee Frenzy" symbols constitute a start bonus outcome, entitling the player to play a free spin bonus game described in greater detail herein.

Figure 4:
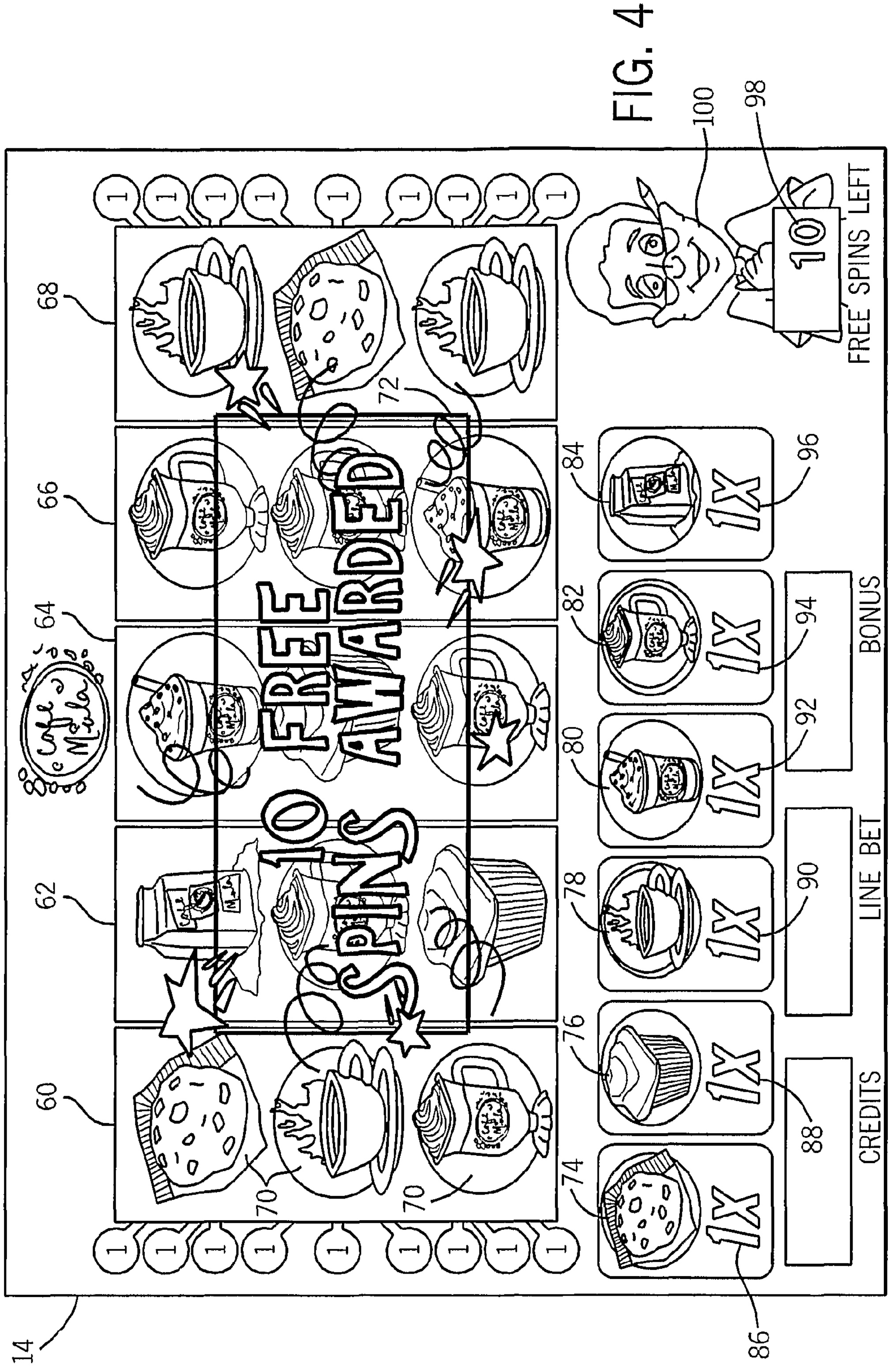
FIG. 4 is a front view of the primary display of the gaming machine depicting the start of a free spin bonus game.

FIG. 4 depicts the primary display 14 displaying a start screen of the free spin bonus game triggered by the three "Coffee Frenzy" symbols in FIG. 3. As seen in FIG. 4, the bonus game commences by awarding the player a number of free spins, which in this embodiment is ten free spins. The award of free spins is displayed to the player on the display 14, via a pop-up window 72 which appears and overlies the reels 60,62,64,66,68. At the bottom of the display 14 are shown a plurality of bonus symbols 74,76,78,80,82,84. Each bonus symbol 74,76,78,80,82,84 is associated with, and represents, a winning outcome which is eligible for a bonus payoff during the free spin bonus game. Preferably, the bonus symbol 74,76,78,80,82,84 is the same or similar to at least one of the symbols 70 in the combination constituting a winning outcome. For example, the first bonus symbol 74 depicted is a "cookie" symbol which is associated with, and signifies that combinations of three or more "cookie" symbols on any active payline 32 is a winning outcome for which a payoff is awarded. Similarly, other winning outcomes include three or more like symbols 70 of the other depicted bonus symbols 76,78,80,82,84 (the "muffin," "hot coffee," "iced coffee," "espresso," and "coffee bag" symbols).

Each eligible winning outcome is associated with a bonus award 86,88,90,92,94,96 which in this preferred embodiment is a multiplier. Other bonus awards may include credit awards, additional free spins, tangible prizes or gifts, or other awards. Each bonus award 86,88,90,92,94,96 has an initial value which is shown in FIG. 4 depicting a start screen of the bonus game. As shown in FIG. 4, the initial value of the bonus award 86,88,90,92,94,96 for each eligible winning combination is a multiplier having a value of 1×. A free spin meter 98 on the display 14 indicates the number of free spins remaining during the bonus game. Adjacent to the free spin meter 98 is an animated character 100 which is displayed throughout the free spin bonus. The animated character 100 is animated in accordance with the quantity of credits awarded during the bonus game. The bonus game progresses by consecutively executing each of the awarded free spins.

Figure 5:
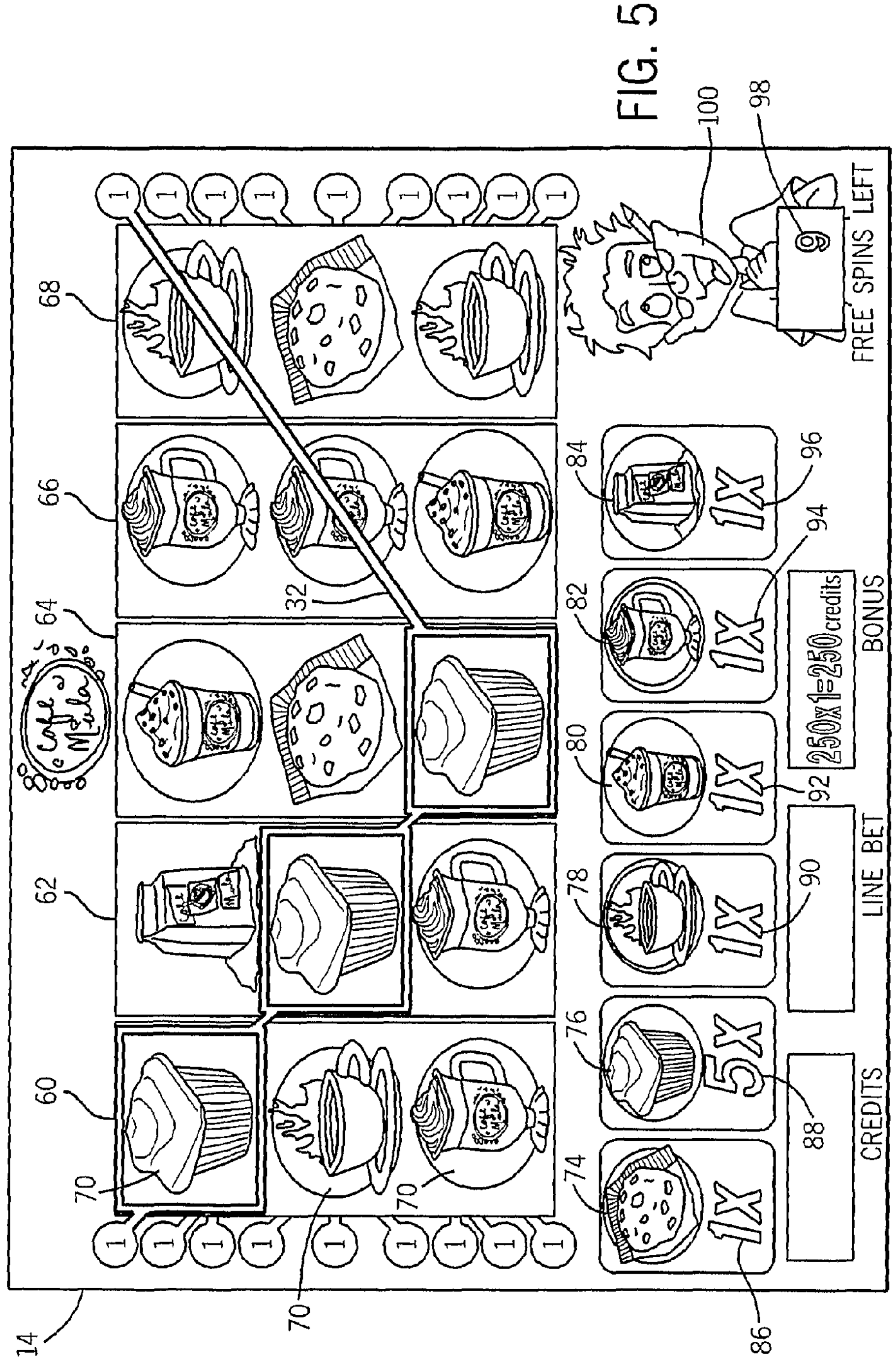
FIG. 5 is a front view of the bonus game during an intermediate stage.

FIG. 5 depicts the display 14 following the execution of the first free spin, which has resulted in a winning outcome, in that three "muffin" symbols have landed on a payline 32. The three "muffin" symbols combination is a winning outcome designated by a bonus symbol 78 having an associated bonus award 88. The player is awarded a payoff which equals a credit amount associated with the winning outcome, as well as the bonus award 88 associated with that winning outcome. In FIG. 5, for example, a three "muffin" symbol combination is a winning outcome associated with a credit amount of 250 credits. The player is awarded the 250 credits plus the bonus award 88 associated with the three "muffin" symbol winning outcome, which in this case is a 1× multiplier (as shown in FIG. 4 prior to being incremented). Thus, the player is awarded a total payoff of 250 credits (250 credits×1=250 credits). In addition, the bonus award 88 associated with the "muffin" winning outcome is changed, and in a preferred embodiment, is incremented from 1× to 5×, as seen in FIGS. 4-5 The incremented bonus award 88 is now available for future spins in the free spin bonus game. The free spin meter 98 is decremented by one to show that nine of the original ten awarded free spins are remaining. The animated character 100 is further animated to demonstrate added excitement as a result of the winning outcome achieved.

Figure 6:
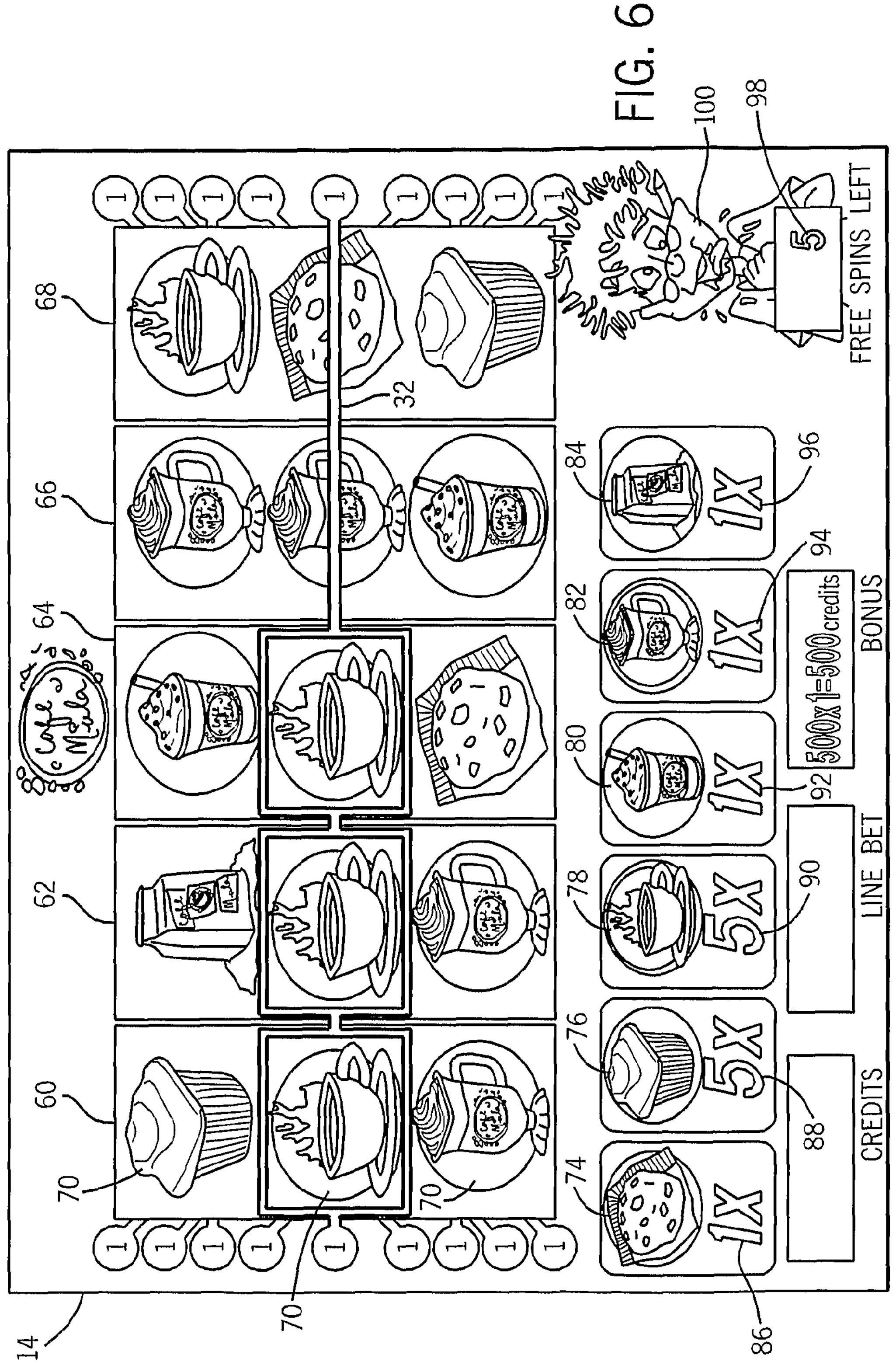
FIG. 6 is a front view of the bonus game during yet another intermediate stage.

FIG. 6 depicts the fifth free spin during the free spin bonus game. The result of this spin is that three "hot coffee" symbols have landed on an active payline 32, which constitutes a winning outcome. The three "hot coffee" symbols combination is a winning outcome designated by a bonus symbol 80 having an associated bonus award 90. Again, the player is awarded a payoff which equals a credit amount associated with the winning outcome, as well as the bonus award 90 associated with that winning outcome. In FIG. 6, the three "hot coffee" symbols combination is a winning outcome associated with a credit amount of 500 credits. Thus, the player is awarded the 500 credits plus the bonus award 90 associated with the three "muffin" symbol winning outcome, which in this case is a 1× multiplier (as shown in FIG. 5 prior to being incremented). Thus, the player is awarded a total payoff of 500 credits (500 credits×1=500 credits). In addition, the bonus award 90 associated with the "hot coffee" winning outcome is incremented from 1× to 5×, as seen in FIGS. 5-6. The incremented bonus award 90 is now available for future spins in the free spin bonus game. The free spin meter 98 is again decremented showing that five free spins remain.

Figure 7:
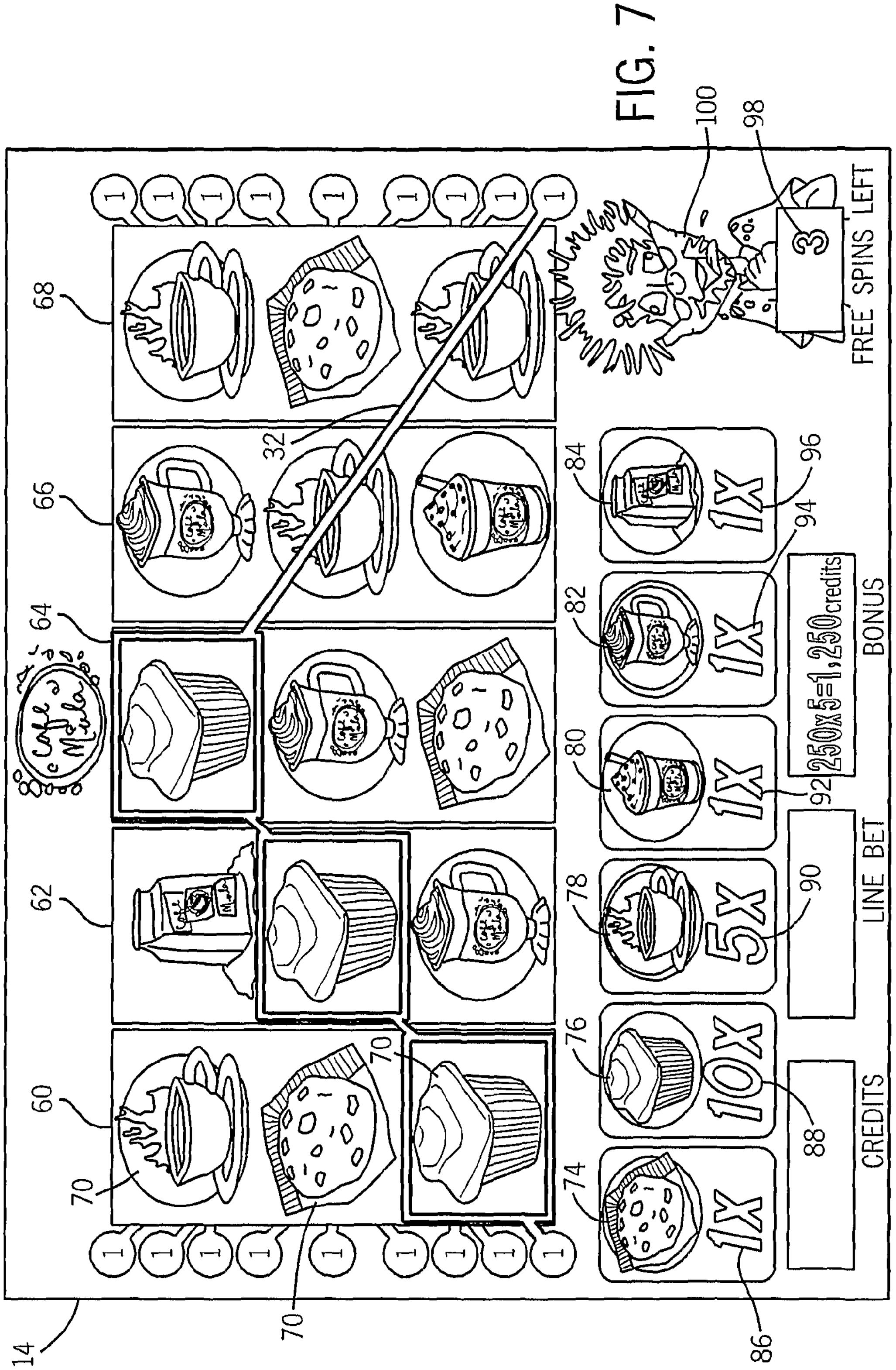
FIG. 7 is a front view of the bonus game during a later intermediate stage.

FIG. 7 depicts the seventh free spin during the free spin bonus game. On this spin, three "muffin" symbols have once again landed on an active payline 32, and again constitute a winning outcome. As before, the three "muffin" symbols combination is a winning outcome designated by a bonus symbol 78 having an associated bonus award 88. Again, the player is awarded a payoff which equals a credit amount associated with the winning outcome, as well as the bonus award 88 associated with that winning outcome. As before, the three "muffin" symbols combination is a winning outcome associated with a credit amount of 250 credits. However, because the bonus award 88 associated with the three "muffin" symbol winning outcome has increased as a result of having been previously awarded and incremented, the payoff awarded to the player is greater. Specifically, the player is awarded the 250 credits associated with the three "muffin" symbol winning combination plus the bonus award 88 associated with the three "muffin" symbol winning outcome, which on this play is a 5× multiplier (as shown in FIG. 6 prior to being incremented). Thus, the player is awarded 1,250 credits (250 credits×5=1250 credits). In addition, the bonus award 88 associated with the three "muffin" winning outcome is again incremented, this time from 5× to 10×, as seen in FIGS. 6-7. The incremented bonus award is now available for future spins in the free spin bonus game. The free spin meter 98 is again decremented showing that three free spins remain. Thus the application of the incremented of the bonus award 88 to a winning outcome may cause a less valuable winning outcome (e.g., three "muffin" symbols, associated with a credit amount of 250 credits) to become more valuable than an initially more valuable outcome (e.g., three "hot coffee" symbols, associated with a credit amount of 500 credits). When the gaming machine 10 has executed all ten of the free spins awarded in the bonus game, the primary display 14 returns to the basic slot game, as seen in FIG. 3.

In the embodiment shown in FIGS. 4-7, the bonus awards 86,88,90,92,94,96 associated with each winning outcome are initially incremented from a 1× multiplier to a 5× multiplier. Following the initial increment, subsequent increments occur in multiples of five (e.g. from 5× to 10×, from 10× to 15×, etc.). However, it should be understood that other incrementing schemes maybe employed. Furthermore, the gaming machine 10 may be configured so that the bonus awards 86,88,90,92,94,96 are changed by other than incrementing. For example, in an alternate embodiment, the bonus award 86,88,90,92,94,96 may be decremented, multiplied, erased, etc. It is only preferred that upon the occurrence of a winning outcome in the free spin bonus round, the bonus award 86,88, 90,92,94,96 associated with that winning outcome be changed and made available for a future play in the bonus round.

Although in the preferred embodiment described herein, the changed bonus awards 86,88,90,92,94,96 are made available for the immediately succeeding spin in the bonus game (and all remaining free spins), other configurations are possible. For example, the bonus awards 86,88,90,92,94,96 may be made available later in the bonus game, such as after a fixed number of spins (e.g. three spins later) or after a certain symbol or combination is achieved (e.g. appearance of a "next level" special symbol which elevates bonus awards to the next level). Alternatively, the bonus awards 86,88,90,92, 94,96 may be made available for the immediately succeeding spin, but for less than all of the remaining spins (e.g. being made available for the next three spins).

In the preferred embodiment described herein, the bonus awards 86,88,90,92,94,96 are made available and incremented during a free spin bonus game. However, an alternate embodiment of the gaming machine 10 may include the use of incrementing bonus awards 86,88,90,92,94,96 in a base game, such a slot game. In such an alternate embodiment, the bonus awards 86,88,90,92,94,96 may be multipliers having an initial bonus award value (e.g., 1×), associated with certain winning outcomes. The multipliers may then be incremented following the occurrence of each associated winning outcome, as described herein. However, to prevent infinite incrementing of the bonus awards 86,88,90,92,94,96, each bonus award 86,88,90,92,94,96 may be associated with a predefined reset value (e.g., 10×) after which the bonus award 86,88,90, 92,94,96 would return to its initial value. Alternatively, or additionally, each bonus award 86,88,90,92,94,96 may reset if no winning outcomes are achieved, such that bonus awards only increment during consecutive plays of the game having at least one winning outcome. Various other schemes may also be employed to prevent infinite incrementing of the bonus awards.

Although the basic game and the bonus game described herein are both slot games, various other games may be played in accordance with the present invention. For example, the basic and/or bonus games may be video poker, keno, blackjack, roulette, etc. All that is preferred is the game have at least one winning outcome associated with a bonus award 86,88,90,92,94,96 (preferably a multiplier), wherein when the winning outcome is achieved, the bonus award 86,88,90, 92,94,96 is awarded to the player, and then incremented, or otherwise changed, for a subsequent play of the game.

The gaming machine 10 of the present invention provides significant advantages over other gaming machines. The incrementing of value of the bonus awards 86,88,90,92,94,96 in the free spin bonus game provides a significant increase in entertainment and enjoyment for the player who is able to visually experience the accumulation of awards. This adds to the player's excitement when a winning combination is repeated, by both awarding the player and incrementing the bonus award 86,88,90,92,94,96 associated with that winning combination. This incrementing feature creates a more enjoyable gaming experience for a player who now is eager to have winning outcomes repeat in order to increase the payoff. This, in turn, benefits the casino or host of the gaming machine 10 in the way of increased play and profits.

Each of these embodiments and obvious variations thereof is contemplated as falling within the spirit and scope of the claimed invention, which is set forth in the following claims.

What is claimed is:

1. A gaming machine comprising:

a value input device for receiving a wager;

a display for displaying a plurality of symbols, the symbols indicating a randomly-selected outcome selected from a plurality of possible outcomes, the plurality of outcomes including at least two winning outcomes, wherein each of the at least two winning outcomes is individually associated with a different bonus award; and a controller configured to: (i) vary the displayed plurality of symbols to display the randomly-selected outcome; and (ii) in the response to the plurality of symbols indicating one of the at least two winning outcomes, (a) award a payoff, which equals a credit amount associated with the indicated winning outcome mathematically combined with a current value of the bonus award associated with the indicated winning outcome, and (b) increase the current value of the bonus award associated with the indicated winning outcome for a future play of the gaming machine.

2. The gaming machine of claim 1, wherein the bonus award associated with the indicated winning outcome is a multiplier.

3. The gaming machine of claim 2, wherein the payoff is equal to a credit amount associated with the indicated winning outcome multiplied by the multiplier.

4. The gaming machine of claim 2, wherein the controller is configured to change the value of the multiplier by incrementing the value of the multiplier.

5. The gaming machine of claim 4, wherein the value of the multiplier is incremented by five.

6. The gaming machine of claim 4, wherein an initial value of the multiplier is one.

7. The gaming machine of claim 1, wherein the plurality of symbols are located on a plurality of moveable mechanical or simulated reels.

8. The gaming machine of claim 7, wherein the controller is configured to vary the plurality of symbols by spinning and stopping the reels.

9. The gaming machine of claim 8, wherein the controller is further configured to award a number of free spins, wherein the current value of the bonus award associated with the indicated winning outcome is increased if the indicated winning outcome is indicated again at a conclusion of one of the free spins.

10. The gaming machine of claim 1, wherein the future play of the gaming machine is an immediately subsequent play.

11. The gaming machine of claim 1, wherein the current value of the bonus award associated with the indicated winning outcome is displayed on the display.

12. A method of conducting a wagering game on a gaming machine, the gaming machine having a value input device, a display, and a controller, the method comprising:

receiving a wager via the value input device;

displaying, via the display, a plurality of symbols located on a plurality of moveable reels, the displayed symbols indicating a plurality of outcomes including a plurality of winning outcomes;

displaying, via the display, a plurality of bonus symbols wherein each bonus symbol shows a bonus award individually associated with a different winning outcome from the plurality of winning outcomes;

moving the reels, via the controller, to display a first randomly-selected outcome; and if the first randomly-selected outcome is a first winning outcome, (i) awarding a payoff comprising a product of a credit amount associated with the first winning outcome and the bonus award associated with the first winning outcome, and (ii) incrementing the bonus award associated with the first winning outcome for a future play of the gaming machine.

13. The method of claim 12, further comprising:

moving the reels, via the controller, to display a second randomly-selected outcome; and if the second randomly-selected outcome is the same as the first winning outcome, (i) awarding a payoff comprising a product of the credit amount associated with the first winning outcome and the previously-incremented bonus award associated with the first winning outcome, and (ii) further incrementing the bonus award associated with the first winning outcome, for a future play of the gaming machine.

14. The method of claim 12, further comprising:

moving the reels, via the controller, to display a second randomly-selected outcome; and if the second randomly-selected outcome is a second winning outcome, (i) awarding a payoff comprising a product of a credit amount associated with the second winning outcome and the bonus award associated with the second winning outcome, and (ii) further incrementing the bonus award associated with the second winning outcome, for a future play of the gaming machine.

15. A method of conducting a wagering game on a gaming machine, the method comprising:

receiving a wager through a value input device;

displaying a plurality of moveable reels having a plurality of symbols located thereon, the symbols indicating a randomly-selected outcome selected from a plurality of possible outcomes, the plurality of outcomes including a plurality of winning outcomes, wherein each winning outcome is individually associated with a respective multiplier from a plurality of displayed multipliers;

awarding a group of free spins when a start bonus outcome is achieved;

initializing a value of the multiplier associated with each winning outcome to an initial value;

executing each free spin in the group by spinning and stopping the reels to display an outcome from the plurality of possible outcomes; and for each winning outcome indicated, (i) awarding a payoff comprising a credit amount associated with the winning outcome multiplied by the multiplier associated with the winning outcome, and (ii) incrementing the value of the multiplier associated with the winning outcome for a future free spin.

16. The method of claim 15, wherein the initial value is one.

17. The method of claim 16, wherein the step of incrementing the value of the multiplier comprises incrementing the value of the multiplier by four if the value of the multiplier is the initial value, otherwise incrementing the value of the multiplier by five.

18. The method of claim 15, wherein the future free spin is one of the group of free spins.

19. The method of claim 15, further comprising:

if a free spin and a subsequent free spin both indicate the same winning outcome, for the subsequent free spin, awarding a payoff comprising the credit amount associated with the winning outcome multiplied by the value of the multiplier after being incremented as a result of the previous free spin.

20. The method of claim 15, further comprising:

if a free spin and a subsequent free spin indicate different winning outcomes, incrementing the bonus awards associated with each indicated winning outcome, following the respective free spin.

* * * * *